(12) United States Patent
Passoni (10) Patent No.: US 9,419,418 B2
(45) Date of Patent: Aug. 16, 2016

(54) WIRE-PULLING DEVICE FOR LAYING ELECTRIC CABLES

(75) Inventor: Gianfranco Passoni, Châtillon (CH)

(73) Assignee: Robotic Consulting Sàrl, Estavayer-le-Lac (CH)

( * ) Notice: Subject to any disclaimer, the term of this patent is extended or adjusted under 35 U.S.C. 154(b) by 73 days.

(21) Appl. No.: 14/343,916

(22) PCT Filed: Aug. 15, 2012

(86) PCT No.: PCT/CH2012/000191
§ 371 (c)(1),
(2), (4) Date: Apr. 21, 2014

(87) PCT Pub. No.: WO2013/037075
PCT Pub. Date: Mar. 21, 2013

(65) Prior Publication Data
US 2014/0217339 A1    Aug. 7, 2014

(30) Foreign Application Priority Data

Sep. 12, 2011   (CH) ........................................ 1505/11

(51) Int. Cl.
*H02G 1/08*      (2006.01)
*B65H 75/40*     (2006.01)
*B65H 75/44*     (2006.01)

(52) U.S. Cl.
CPC ............. *H02G 1/083* (2013.01); *B65H 75/406* (2013.01); *B65H 75/4486* (2013.01); *H02G 1/085* (2013.01); *B65H 2701/376* (2013.01)

(58) Field of Classification Search
CPC ... H02G 1/083; H02G 1/08; B65H 2701/376; B65H 75/406; B65H 75/4486
See application file for complete search history.

(56) References Cited

U.S. PATENT DOCUMENTS 2,556,484 A * 6/1951 Raney .................... H02G 1/085
                                                            242/390.3
(Continued)

FOREIGN PATENT DOCUMENTS

WO    2010/111801 A2    10/2010

OTHER PUBLICATIONS

International Search Report Corresponding to PCT/CH2012/000191 mailed Jun. 12, 2013.

*Primary Examiner* — Joseph J Hail
*Assistant Examiner* — Henry Hong
(74) *Attorney, Agent, or Firm* — Davis & Bujold, PLLC; Michael J. Bujold (57) ABSTRACT

A wire-pulling device, in particular for laying electric cables in a building, comprising a frame (16), a spool of a flexible elongate element (6a) wound into a coil, and means for unwinding the member and advancing same into a section of a duct of an electric facility. The spool is mounted on a rotary drum (2) driven by a mechanism (13). The drum (2) has a U-shaped section in which the flexible elongate member is located. The flexible elongate member is fed into a rigid guide member arranged tangentially relative to the periphery of the rotary drum. The drum (2) drives a set of guide rollers (19) arranged at the periphery thereof. Each roller has a central section (3) having a diameter that is larger than that of the side sections (4) thereof that surround same. The two side sections engage with the ends of the arms of the U while the central section contacts the flexible elongate member (6) arranged between the arms of the U. The contact of the central section has a tangential velocity higher than the velocity of the arms of the U with the flexible elongate member. The wire-pulling device includes an electronic device for controlling the motor for driving the drum.

6 Claims, 6 Drawing Sheets

(56) References Cited

U.S. PATENT DOCUMENTS

| | | | | |
|---|---|---|---|---|
| 2,718,376 A | * | 9/1955 | Raney | H02G 1/085 15/104.33 |
| 3,776,179 A | * | 12/1973 | Raney | B08B 9/0323 118/306 |
| 4,092,780 A | * | 6/1978 | Trethewey | G01B 3/1084 254/134.3 FT |
| 4,413,808 A | * | 11/1983 | Finkle | H02G 1/085 226/51 |
| 6,254,026 B1 | * | 7/2001 | Tsai | B65H 75/406 242/390.2 |
| 6,361,021 B1 | * | 3/2002 | Brennan | B65H 75/305 254/134.3 FT |
| 6,722,603 B1 | | 4/2004 | Atencio | |
| 2006/0000936 A1 | * | 1/2006 | Caamano | B65H 75/403 242/390.9 |

* cited by examiner

WIRE-PULLING DEVICE FOR LAYING ELECTRIC CABLES

This application is a National Stage completion of PCT/CH2012/000191 filed Aug. 15, 2012, which claims priority from Swiss patent application serial no. 1505/11 filed Sep. 12, 2011.

FIELD OF THE INVENTION

The present invention relates to a wire-pulling device, in particular for laying electrical cables in a building, comprising a frame, a spool of a flexible elongate element wound into a coil, and means for unwinding this element and advancing the same into a section of a duct of an electrical facility, said spool being mounted on a rotary drum driven by a mechanism, said drum having a U-shaped cross-section in which the flexible elongate member is arranged, the latter being fed into a rigid guide member arranged tangentially relative to the periphery of said rotary drum.

BACKGROUND OF THE INVENTION

The problem of feeding electrical cables into ducts or conduits has been known for a long time. A presentation of this problem can be found in the published patent application WO 2010/111801.

Presently this problem has been solved in particular by devices such as those presented for example in publications U.S. Pat. No. 2,556,484 (published on Jun. 12, 1951) and U.S. Pat. No. 6,722,603 (published on Apr. 20, 2004). The device described in document U.S. Pat. No. 2,556,484 presents a wire-pulling device, in particular for laying electrical cables in a building, comprising a frame, a spool of a flexible elongate element wound into a coil, and means for unwinding this element and advancing the same into a section of a duct of an electrical facility, said spool being mounted on a rotary drum driven by a mechanism, said drum having a U-shaped cross-section in which the flexible member is arranged, the flexible elongate member being fed into a rigid guide member arranged tangentially relative to the periphery of said rotary drum. Although this device seems to describe an apparatus that can operate, the use of this apparatus must show great difficulties. Because, when pushing the flexible element into a duct, the pushing force due to the knees and frictions of said element will increase, and the flexible element will tend to create convolutions towards the outside, which will rest on the rollers and on the housing until the drive motor will block. Moreover, this device will require the presence of at least two operators.

Document U.S. Pat. No. 6,722,603 describes a relatively simple device that makes no statement relating to the reaction force at the moment of the feeding of the flexible element into a duct. This device also requires the presence of two operators, one to hold the device and a second one to fasten the wires.

SUMMARY OF THE INVENTION

The invention aims to provide a device that does not show the disadvantages of the known devices. That is to say a device that can be used by one single operator and that does not show the disadvantages of the known devices, in particular the possibilities of getting blocked.

In the device according to the invention, the flexible elongate element is pushed outwards by the fact that the guide rollers have a diameter that is larger in their central section than in their side sections, which gives them a higher peripheral velocity than that of the drum, therefore the flexible element is pushed outwards by another force than that due to its unwinding.

BRIEF DESCRIPTION OF THE DRAWINGS

The present invention and its characteristics will be better revealed in the description of embodiments given merely as non limiting examples, in reference to the drawings, in which:

FIGS. 1b and 1c both represent a schematic cross-section of variants of the embodiment represented in FIG. 1a.

FIG. 2 represents a detail of the device represented in FIG. 1a.

DETAILED DESCRIPTION OF THE PREFERRED EMBODIMENTS

It must be noted that the same reference signs have been used in all drawings to designate the same characteristics.

Figure 1A:
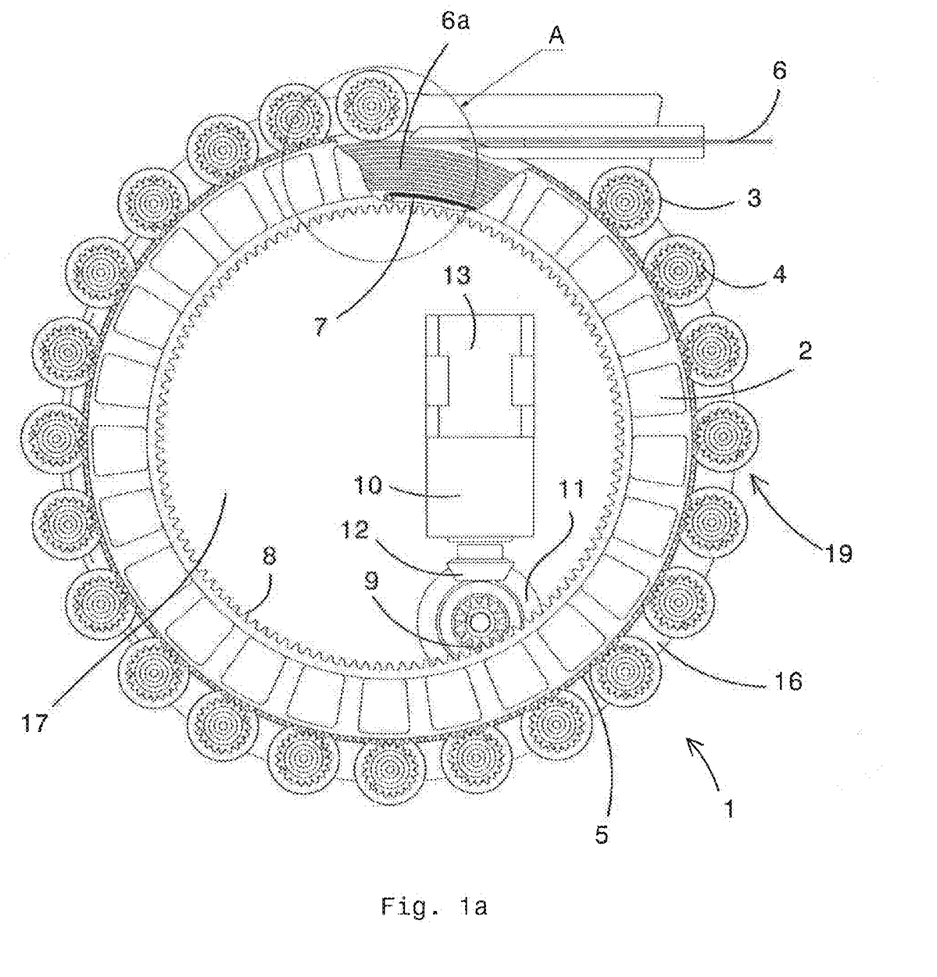
FIG. 1a represents a schematic cross-section of an embodiment of a wire-pulling device according to the invention.
Figure 3:
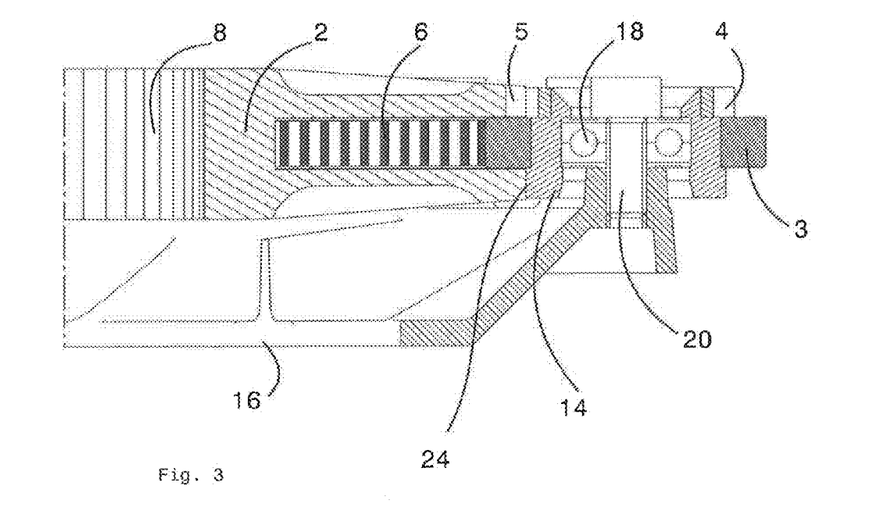
FIG. 3 represents a cross-section of the detail represented in FIG. 2.

As shown in FIG. 1a, a wire-pulling device 1 for laying electrical cables according to the invention comprises a frame 16 used as a support for a drum 2 with a U-shaped cross-section and carrying a spool 6a of a flexible elongate element 6, for example a spring steel strip or a wire. The frame 16 is provided with a central opening 17 in which a drive motor 13 with a reducing gear 10 is housed. The drive motor 13 is powered by a non-represented battery and is coupled with a drive pinion 12 that meshes with a ring gear 11 connected to a pinion 9 that drives teeth 8 arranged on drum 2. When turning, drum 2 drives the rotation of guide rollers 19 arranged on the periphery of said drum 2 on frame 16. The rollers mounted on ball bearings 18 are fastened to frame 16 by bolts 20. In the represented embodiment, the rollers 19 are driven by teeth 5 arranged on the external section of one of the arms of the U of drum 2 that mesh with teeth 4 arranged on a side section of rollers 19. In another non-represented embodiment, there are no teeth on the external section of the arms of said U, nor on the guide rollers, and the guide rollers are simply driven by friction on the upper section of the arms of the U. In another non-represented embodiment, teeth are provided on the outside of both arms of said U and on both side sections of the guide rollers. FIG. 3 shows that the guide rollers 19 have three sections: a first side section 14, a central section 3 with a diameter that is larger than that of the side section, and a second side section 4 showing teeth and having a diameter that is smaller than that of central section 3.

Figure 4:
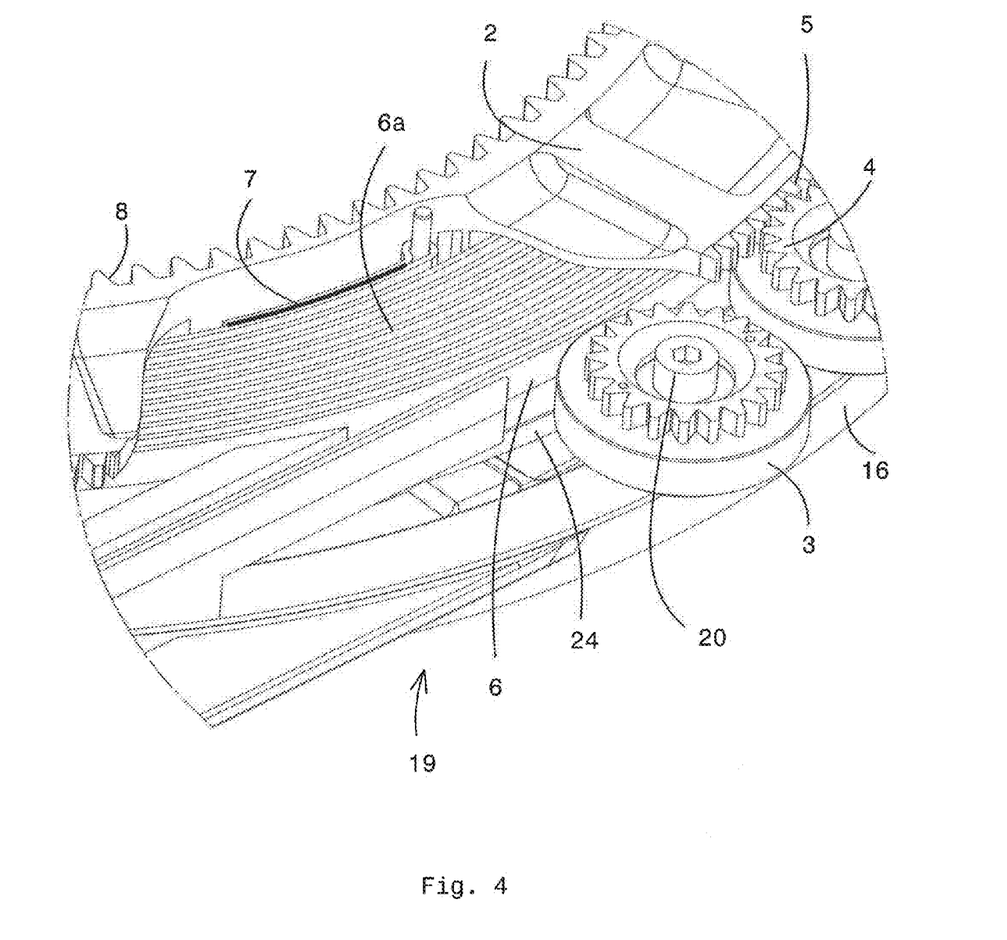
FIG. 4 represents a perspective view of the detail represented in FIG. 2.

FIG. 3 represents a strongly magnified detail of the area where flexible elongate element 6 exits drum 2. FIG. 4 shows the same detail as FIG. 3, but in a perspective view.

FIGS. 3 and 4 allow understanding better the basic principle of the invention explaining how the flexible elongate element 6 is pushed in a duct, not by the unwinding force of said element 6, but by guide rollers 19. Since the circumference 3 of the central section of rollers 19 is larger than that of their side sections 4 and 14 and is in contact with flexible elongate element 6, it will communicate a velocity higher than that of drum 2, which will prevent the turns of said element from being compressed and therefore pushed against the rollers. These provisions make sure that no blocking can occur. As shown in FIGS. 3 and 4, the external ends of the arms of said U are in contact with the guide rollers on their side sections, on one side with teeth 5 and on the other side 24 by friction. Finally, the way element 6 is fastened in drum 2 by a folded-over section 7 must be noted.

Figure 1B:
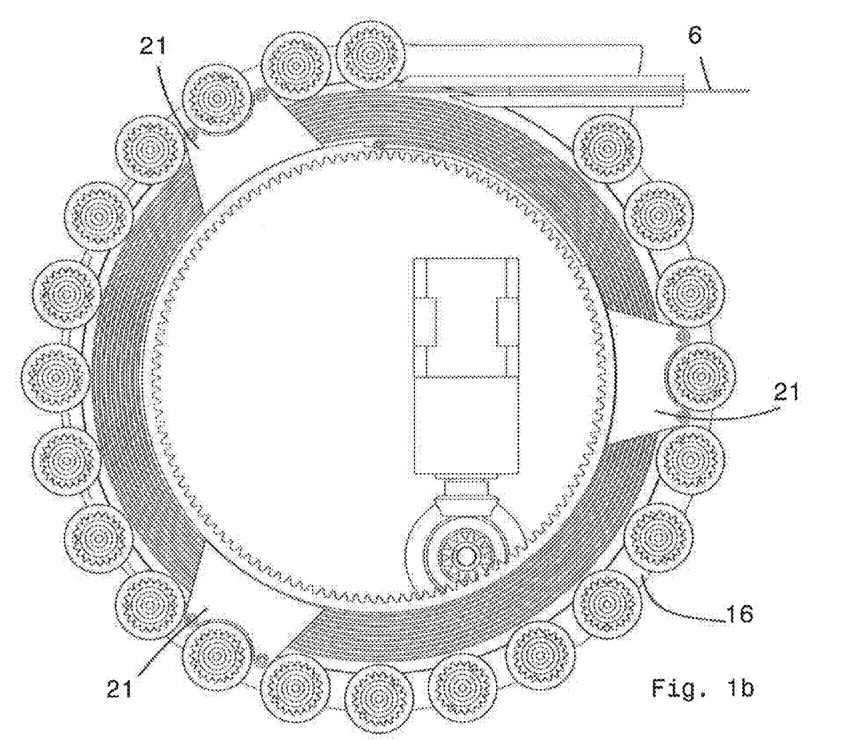
Figure 1C:
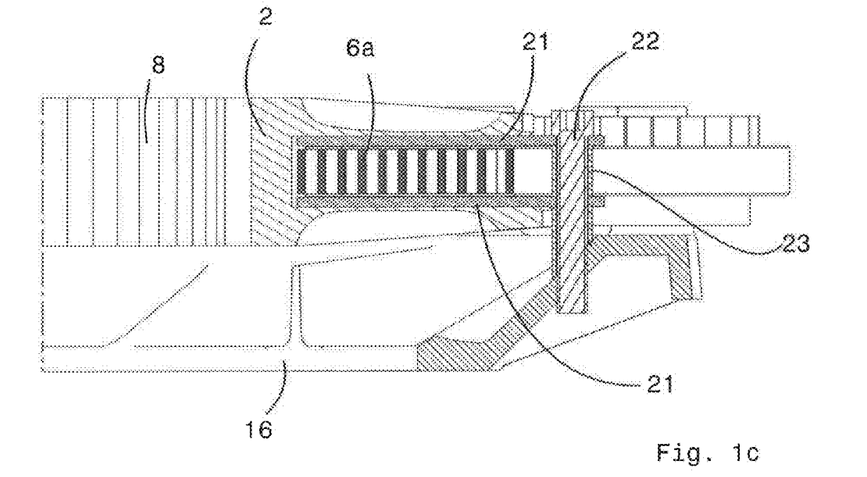
Figure 2:
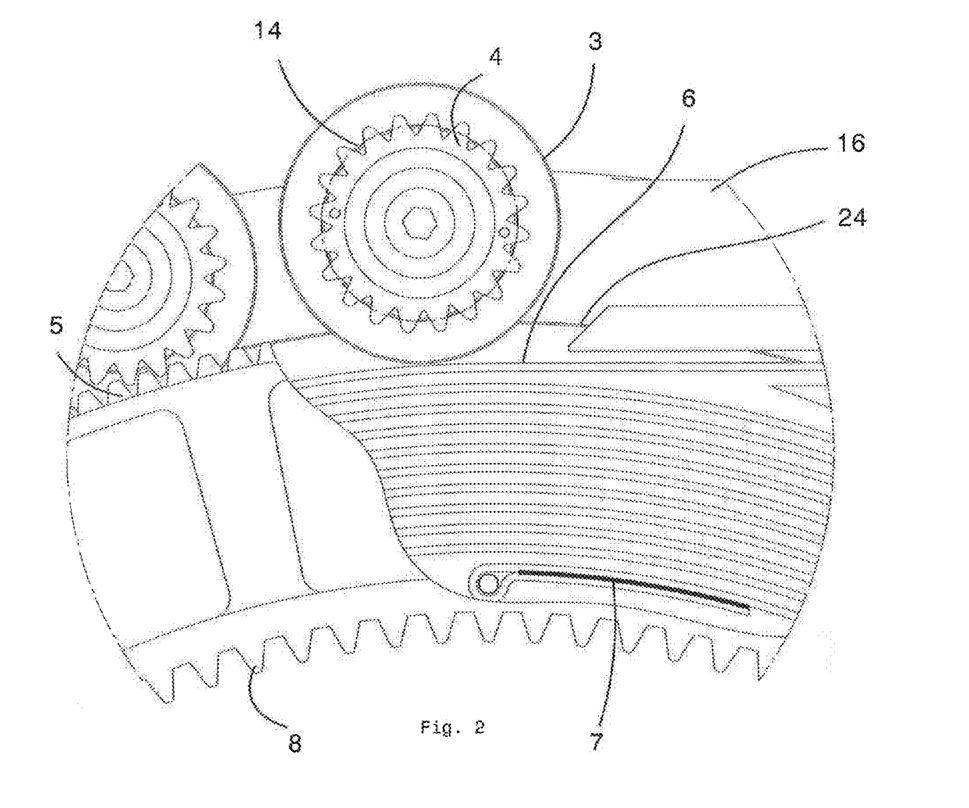

FIGS. 1b and 1c represent a variant of FIG. 1a in which any contact between the flexible elongated element 6 and the internal sides of said U has been eliminated, so that said element 6 is not driven by drum 2. To that purpose plates 21 are provided and fastened on frame 16, uniformly distributed on the periphery of drum 2 and arranged inside of said U, said plates 21 having a low friction coefficient, for example "Teflon". The represented device includes three plates 21 arranged at 120°, but more plates could be provided, arranged for example at 90°.

Figure 5:
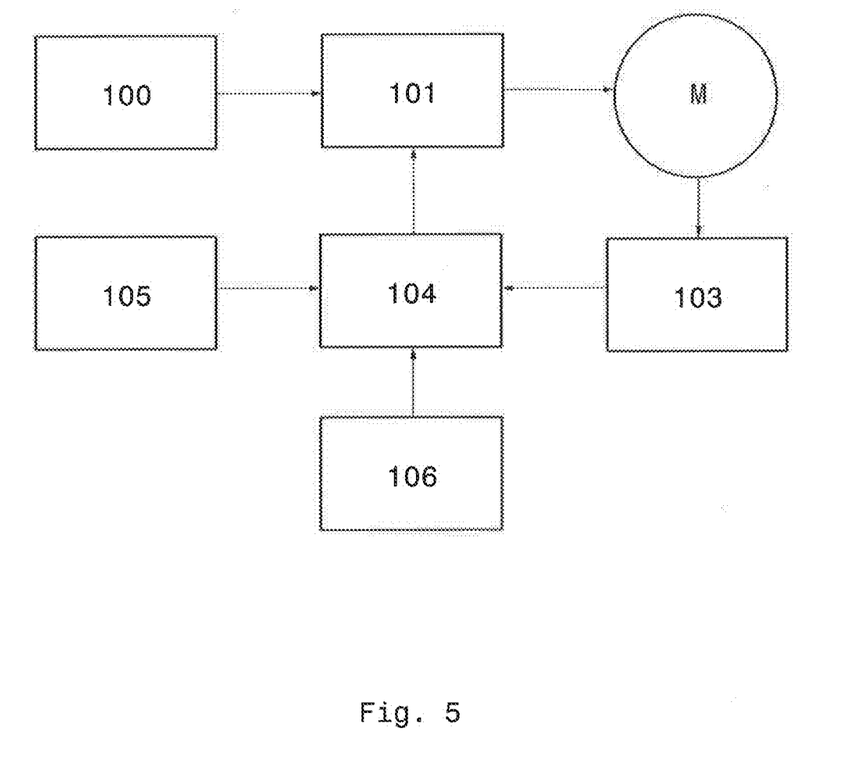
FIG. 5 is a block diagram of the control of the drum drive motor.

FIG. 5 represents an embodiment of the block diagram of the electronic control of the described wire-pulling device. The power supply 100 is connected to a drive amplifier 101 that is connected to the geared motor M. The electronic circuit operates in reactive mode by means of a continuously monitored current loop. This loop includes a current control unit 103 that is connected to a microprocessor 104 provided with an embedded software. The operating controls include at least one pushbutton 105 (26 in FIG. 6) that controls the start and stop of the geared motor. A current set point unit 106 includes potentiometers to determine the values of the intensities of the power supply current. The microprocessor analyzes in real-time the current consumption of the geared motor and determines automatically the operating mode of the device. Direct actuations of the control button or short tractions on the flexible elongate element allow controlling the pushing operations during the first operational phase or the pulling operations during the second phase.

Figures 6, 7:
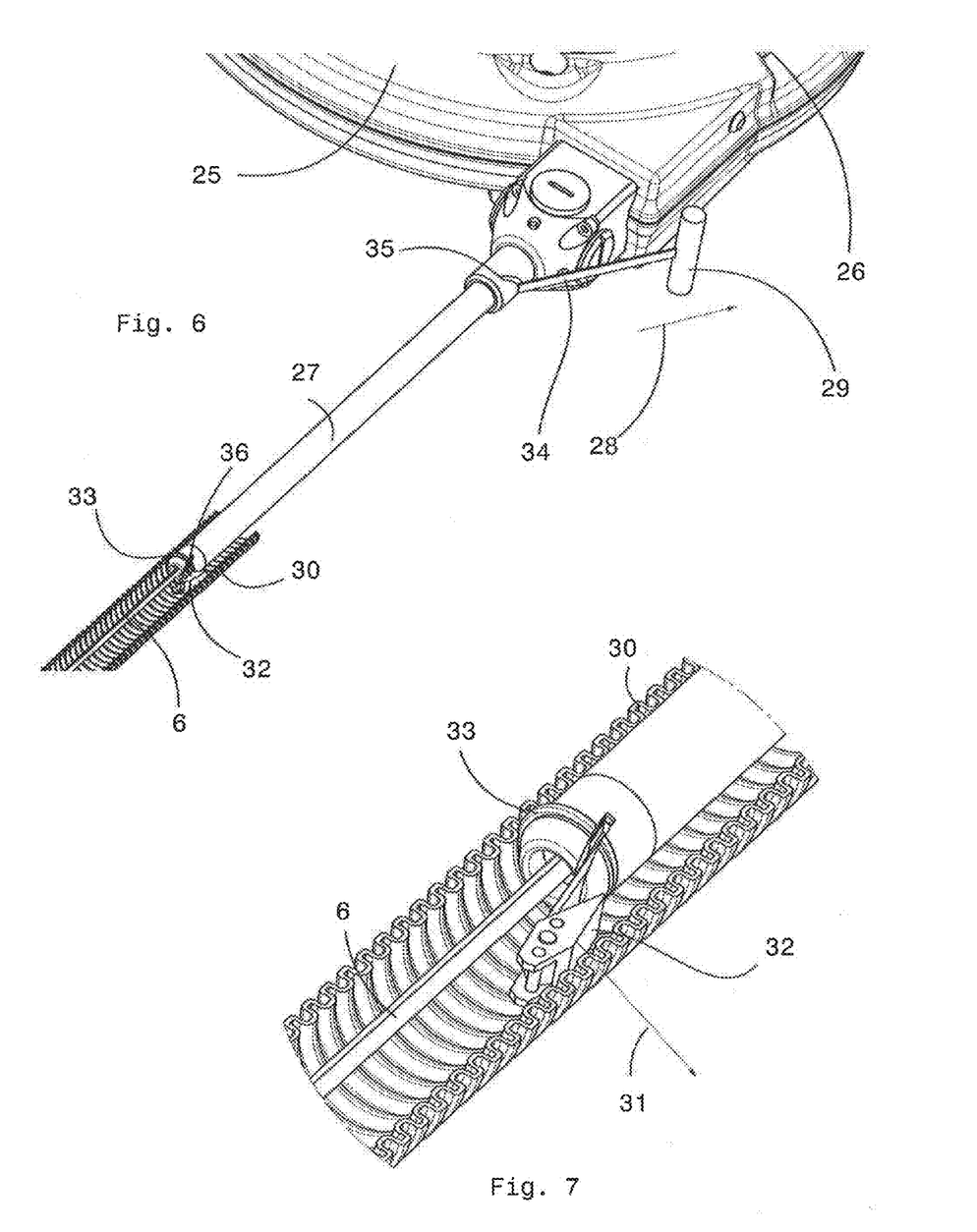
FIGS. 6 and 7 represent an embodiment of the device that allows blocking the wire-pulling device represented in FIGS. 1a and 1b in a duct.

FIGS. 6 and 7 represent a rigid guide member 27 arranged tangentially (see FIG. 1) relative to the periphery of said rotary drum. The rotary drum and its frame are housed in a housing 25 provided with a button 26 that controls the start and stop of the device. The guide member 27 comprises means intended for allowing fastening it in a duct 30 into which the flexible elongated member 6 is to be fed, in order to allow the device to operate without the presence of any operator, that is to say feed the flexible elongated member 6 into duct 30. The means intended to allow fastening the device in a duct 30 include a rigid tube 27 having at its distal end a tip with an asymmetric shoulder 33 intended to rest inside of duct 30 in which the flexible elongate element is fed, and a mobile flexible blade 34 provided at its distal end with means 32 allowing to block said shoulder against the wall of said duct, and a handle 29 at its proximal end. Said blade 34 protrudes at the distal end of tube 27 through a slot 36 and has at its distal end a wedge 32 that presses, as shown by arrow 31, shoulder 33 against duct 30 when blade 34 protruding through slot 35 is pulled by handle 29 according to arrow 28, as shown in FIG. 7.

A wire-pulling device according to the invention is used as follows:

The guide member 27 is introduced in the duct in which wires are to be laid, and the device is locked in this position by pulling lever 29.

The device is started by pressing button 26.

The operator goes to the outlet end of the duct.

When the end of the flexible elongate element appears, the operator grips it and pulls it slightly, which stops the unwinding of the flexible element.

The operator attaches the wires to the end of the flexible element and pulls them slightly, which starts the winding of the flexible element.

The same operation is repeated for all ducts through which wires have to be pulled.

The invention claimed is:

1. A wire-pulling device, for laying electrical cables in a building, comprising:
   a frame,
   a spool of a flexible elongate element wound into a coil, and
   a driven unwinding mechanism for unwinding the element and advancing the element into a section of a duct of an electrical facility, and
   the spool being mounted on a rotary drum driven by a motor mechanism, the drum having a U-shaped cross-section in which the flexible elongate member is arranged, and the flexible elongate member being fed into a rigid guide member arranged tangentially relative to a periphery of the rotary drum,
   wherein the drum drives a set of guide rollers arranged about the periphery thereof, each roller having a central section with a diameter that is larger than that of two side sections surrounding the central section, the two side sections rest on the ends of the arms of the U while the central section contacts the flexible elongate member arranged between the arms of the U, and the contact of the central section has a tangential velocity higher than the velocity of the arms of the U with the flexible elongate member,
   guide member includes a rigid tube having a tip, at a distal end thereof, with an asymmetric shoulder intended to rest inside of the duct in which the flexible elongate element is introduced, and a mobile flexible blade is provided at the distal end which, when activated, facilitates blocking the shoulder against the wall of the duct, and
   the wire-pulling device includes an electronic device for controlling a motor for driving the drum.

2. The wire-pulling device according to claim 1, wherein the wire-pulling device is used to lay electrical cables in a building.

3. The wire-pulling device according to claim 1, wherein the guide rollers have teeth, on one of the side sections, that mesh with teeth arranged on the corresponding arm of the U.

4. The wire-pulling device according to claim 1, wherein plates, fastened on the frame, are arranged inside of the U and eliminate any contact between the flexible elongate element and the arms of the U.

5. The wire-pulling device according to claim 1, wherein the wire-pulling device includes an electronic board and embedded software to allow dialog with an operator by simple pushing and pulling actions on the flexible element, without the use of a remote control.

6. A wire-pulling device comprising:
   a frame,
   a spool of a flexible elongate element wound into a coil,
   an unwinding mechanism for unwinding and advancing the elongate element into a section of a duct of an electrical facility, and
   the spool being mounted on a rotary drum and being driven by a motor mechanism, the drum having a U-shaped cross-section in which the flexible elongate member is accommodated, and the flexible elongate member being fed into a rigid guide member arranged tangentially relative to a periphery of the rotary drum, wherein the drum drives a set of guide rollers arranged about the periphery thereof, each roller has a central section with a diameter that is larger than that of two opposed side sections surrounding the central section, the two opposed side sections rest against the ends of the arms of the U while the central section contacts the flexible elongate member arranged between the arms of the U, and the contact of the central section having a tangential velocity higher than the velocity of the arms of the U with the flexible elongate member, guide member includes a rigid tube having a tip, at a distal end thereof, with an asymmetric shoulder intended to rest inside of the duct in which the flexible elongate element is introduced, and a mobile flexible blade is provided at the distal end which, when activated, facilitates blocking the shoulder against the wall of the duct, and the wire-pulling device includes an electronic device for controlling a motor for driving the drum.

* * * * *